(12) United States Patent
Reinhorn et al.

(10) Patent No.: US 6,185,015 B1
(45) Date of Patent: Feb. 6, 2001

(54) COMPACT PLANAR OPTICAL CORRELATOR

(75) Inventors: Silviu Reinhorn, Mevaseret Zion; Asher Friesem; Yaakov Amitai, both of Rehovot, all of (IL)

(73) Assignee: Yeda Research & Development Co. LTD, Rehovot (IL)

(*) Notice: Under 35 U.S.C. 154(b), the term of this patent shall be extended for 0 days.

(21) Appl. No.: 09/445,687
(22) PCT Filed: Jun. 11, 1998
(86) PCT No.: PCT/IL98/00269
§ 371 Date: Mar. 7, 2000
§ 102(e) Date: Mar. 7, 2000
(87) PCT Pub. No.: WO98/57236
PCT Pub. Date: Dec. 17, 1998

(30) Foreign Application Priority Data

Jun. 12, 1997 (IL) .................................................. 121067

(51) Int. Cl.[7] .................................................. G02B 5/32
(52) U.S. Cl. .................................................. 359/15; 359/19; 359/29; 359/34; 359/561; 385/14
(58) Field of Search .................................................. 359/15, 19, 29, 359/34, 561; 356/71, 347; 382/210, 278, 280; 385/14

(56) References Cited

U.S. PATENT DOCUMENTS 5,627,678 5/1997 NIshii et al. .......................... 359/561

FOREIGN PATENT DOCUMENTS 4-354076 12/1992 (JP).

OTHER PUBLICATIONS

Reinhorn, S. et al, "Fourier Transformation with a Planar Holographic Doublet", *Optics Letters*, vol. 20, No. 5, Mar. 1, 1995, pp. 495–497.

Jahns, J. et al, "Imaging with Planar Optical Systems", *Optics Communications*, vol. 76, No. 5,6, May 15, 1990, pp. 313–317.

Glaser, I, "Compact Lenslet–Array–Based Holographic Correlator/Convolver", *Optics Letters*, vol. 20, No. 14, Jul. 15, 1995, pp. 1565–1567.

Paek, E. et al., "Holographic Associative Memory for Word–Break Recognition", *Optics Letters*, vol. 14, No. 4, Feb. 15, 1989, pp. 205–207.

*Primary Examiner*—Darren Schuberg
(74) *Attorney, Agent, or Firm*—Browdy And Neimark

(57) ABSTRACT

A planar optical correlator including at least first and second optical substrates (30, 32), through which light propagates by means of total internal reflection, at least first and second holographic lenses (20, 22) on the first optical substrate and optical third and fourth holographic lenses (24, 26) on the second optical substrate, each of the first and second and third and fourth holographic lenses performing a Fourier transformation on the input light to their respective optical substrates, the substrates positioned such that the second and third holographic lenses at least partially face each other. A filter (36) is positioned between the second and third holographic lenses.

17 Claims, 5 Drawing Sheets

COMPACT PLANAR OPTICAL CORRELATOR

CROSS REFERENCE TO RELATED APPLICATION

The present application is the national stage under 35 U.S.C. 371 of PCT/IL98/00269, filed Jun. 11, 1998.

FIELD OF THE INVENTION

The present invention relates to the field of holographic optical correlators.

BACKGROUND OF THE INVENTION

Optical correlators are employed for many optical signal processing applications, including pattern and character recognition, implementation of optical interconnections in hybrid optoelectronic parallel computers, and in artificial neural network technologies. Holographic optical correlators can compute two dimensional geometrical correlations in much less time than it takes to input an image into an optical system, to convert the output optical signal into electronic signals, and to perform electronic correlation on the resultant signals. For these reasons, they have become important elements of modern high speed optical information handling and processing systems.

Conventional optical correlators currently in use are based on discrete optical elements and free space propagation. They typically comprise two pairs of identical refractive lenses, each lens of each pair separated from its partner by a distance equal to the focal length of the lenses. A holographic filter is sandwiched between the two pairs. The first pair performs a Fourier transformation, with the input plane adjacent to the first lens of the pair and the Fourier plane adjacent to the second lens of the pair.

The complex field at the back focal plane of the first lens, which falls at the second lens because the lens spacing is equal to the focal length, provides a Fourier transformation of the input plane multiplied by a complex quadratic phase term. The second lens has an identical but opposite quadratic phase, so an exact transformation is achieved at the Fourier plane at this lens. A complex filter is placed at this plane behind the lens. The second lens pair comprising a similar pair of refractive lenses and therefore performs another exact Fourier transformation. The result at the output plane of the second lens of this second pair is the correlation function between the input signal function on the input plane of the first lens, and the filter function. In practice, the fourth lens can be omitted because the detectors generally used to sense the correlation output are sensitive only to the intensity distribution, so there is no need for phase correction.

The physical size of such correlators is large and their components must be mounted and aligned mechanically. This results in bulky set-ups, thermal instability and relatively low positioning accuracies, in the range of several microns. All of these factors makes such correlators incompatible with the small size and circuit construction techniques used in modern integrated optoelectronic technology.

Optical correlators based on variations of this classical free space model have been proposed in an attempt to obtain more compact correlators. One such correlator, as described by M. Zimmerman in "The 1992 French-Israeli Workshop on Optical Computing—Digest of Papers" edited by P. H. Cheval and I. Glaser, (Israeli Ministry of Science, Jerusalem, 1992) pp. 31–32, includes folding mirrors with lenses designed to minimise correlator dimensions.

Further miniaturisation has been obtained by the use of multiple bee's-eye lenslet arrays, as described by I. Glaser in the article "Compact lenslet-array-based holographic correlator/convolver", published in Optics Letters, Vol.20, No.14, pp.1565–1567, July. 1995. A comparison of the performance, size and speed of such correlators with that of electronic processor-based correlators and conventional folded optics correlators is shown below.

| Correlator type | Kernel size (pixels) | Input size (pixels) | Response time (sec.) | Volume (cc.) |
|---|---|---|---|---|
| Microprocessor | 32 × 32 | 512 × 512 | ~$10^2$ | <1 |
| DSP chip | 32 × 32 | 512 × 512 | ~1 | <1 |
| Dedicated electronic | 7 × 7 | 512 × 512 | ~$10^{-1}$ | ~10 |
| Coherent optical (folded) | 64 × 64 | 64 × 64 | $\leq 10^{-3}$ | ~500 |
| Lenslet array correlator | 32 × 32 | 512 × 512 | $\leq 10^{-3}$ | ~20 |

It is evident from the above comparison that even though the lenslet array optical correlator is considerably smaller than a corresponding bulk optical correlator, it has dimensions which are still over an order of magnitude greater than those of associated optoelectronic circuit packages. There is, therefore, great need for an optical correlator which combines the speed of optical processing techniques with the small dimensions typical of microelectronic technology. In terms of the specifications in the above table, this would mean a response time of $\leq 10^{-3}$ sec. and a volume of <1 cc., whilst maintaining high pixel count for the kernel and input image dimensions.

Planar technology is a very compact optical fabrication technology, fully compatible with microelectronic detectors and devices. In planar technology, the elements are executed on thin optical substrates, ususally as diffractive optical elements, using patterns generated by microelectronic production techniques such as photolithography and etching. Such planar optical systems have been developed to perform basic imaging functions, as described by J. Jahns and S. Walker in the article "Imaging with planar optical systems" in Optics Communications, Vol. 76, No. 5–6, May 1990, pp. 313–317.

The use of planar substrates for performing Fourier transformation has been described by S. Reinhorn, S. Gorodeisky, A. A. Friesem and Y. Amitai in the article "Fourier transformation with a planar holographic doublet" published in Optics Letters, Vol. 20, No. 5, March 1995, pp. 495–497, which is incorporated herein by reference. The article deals principally with the need to design the grating function of the holographic lens doublet used to perform Fourier transformation, in such a way as to avoid the phase errors which arise when using such lenses off-axis, as required in the planar configuration.

In the final paragraph of this article, the authors raise the possibility that optical data processing systems requiring the use of Fourier transformation, such as optical correlators and convolvers, could be constructed using planar fabrication technology. They state that "When these doublets are incorporated into optical data processing applications such as optical correlators and convolvers, the scaling factors should be taken into acount when the needed optical filters are designed." They did not however show how such a correlator could be constructed and operated.

SUMMARY OF THE INVENTION

Accordingly, it is an object of the present invention to overcome the limitations of the prior art by providing a holographic optical correlator with a level of compactness compatible with typical optoelectronic circuit package sizes.

There is thus provided in accordance with a preferred embodiment of the invention, a planar optical correlator comprising at least two thin planar substrates made of an optical medium such as glass, on each of which is recorded or attached at least two holographic lenses. The light propagates inside each substrate between the at least two lenses by means of total internal reflection, or, if the surfaces of the substrates are coated with a reflecting layer, by means of specular reflection. Each set of at least two lenses performs an exact Fourier transformation, but with different scale factors between the two orthogonal lateral directions because of the off-axis orientation of the propagation.

At the input to one of the substrates is attached a two dimensional display or an illuminated transparency, which acts as the input device, and at the output of the other, a two dimensional detector, such as a CCD array. A filter containing the target signal information is disposed between the output lens of the first substrate and the input lens of the second substrate. The filter construction takes into account the different scale factors in the Fourier plane. The complete assembly then comprises a planar optical correlator, which operates with coherent or incoherent illumination. The output holographic lens can be replaced by a simple linear grating to couple the light out of the substrate, where it can be detected by the CCD array.

There is also provided in accordance with another preferred embodiment of the present invention, a planar optical correlator including at least first and second optical substrates, through which light propagates by means of internal reflection; at least first and second holographic lenses disposed on the first optical substrate, and at least third and fourth holographic lenses disposed on the second substrate, each of the at least first and second and at least third and fourth holographic lenses being operative for performing a Fourier transformation of light inputted to its respective substrate, and whose at least first and second substrates are disposed such that the second holographic lens at least partially faces the third holographic lens, and a filter containing target signal information disposed between the second and third holographic lenses.

There is additionally provided in accordance with another preferred embodiment of the present invention, a planar optical correlator whose filter is a holographic filter or a filter including a dynamic spatial light modulator, such as a transmissive liquid crystal display.

There is further provided in accordance with yet another preferred embodiment of the present invention, a planar optical correlator wherein a linear grating is disposed following the filter to ensure normal incidence of the light into the second substrate.

There is also provided in accordance with yet another preferred embodiment of the present invention, a planar optical correlator whose holographic lenses have different optical powers in the two orthogonal lateral directions to compensate for the off-axis orientation of the propagation.

There is also provided in accordance with still another preferred embodiment of the present invention, a planar optical correlator whose holographic lenses are recorded by means of two waves that interfere to generate the grating function $$\varphi_h = -\frac{2\pi}{\lambda}\left[\frac{x^2\cos^2\theta_0 + y^2}{2F} - x\sin\theta_0\right]$$

where $\lambda$ is the wavelength, F is the focal length of the lens, $\theta_0$ is the off-axis angle inside the substrate and (x,y) are the lateral coordinates at the plane of the holographic lens.

There is additionally provided in accordance with yet another preferred embodiment of the present invention, a planar optical correlator wherein the filter has different characteristics in the two orthogonal lateral directions to compensate for the off-axis orientation of the propagation.

There is further provided in accordance with another preferred embodiment of the present invention, a planar optical correlator wherein the optical input to the first holographic lens is provided by means of a two dimensional display or an illuminated transparent medium containing the input signal.

There is also provided in accordance with yet another preferred embodiment of the present invention, a planar optical correlator wherein the optically correlated output signal at the fourth holographic lens is detected by means of a two dimensional detector such as a CCD array.

There is additionally provided in accordance with a further preferred embodiment of the present invention, a planar optical correlator whose fourth holographic lens is replaced with a linear grating for outputting the light to the detector array.

There is also provided in accordance with yet further preferred embodiments of the present invention, a planar optical correlator whose first and second substrates are aligned either contiguously one after the other, or overlapping, one on top of the other to effectively comprise one continuous substrate.

There is further provided in accordance with yet another preferred embodiment of the present invention, a planar optical correlator wherein the filter containing the target signal information is reflective, and the second holographic lens, the third holographic lens and the reflective filter are all disposed one on top of the other, or wherein the second and third holographic lenses are combined into one element which is disposed on top of the reflective filter.

BRIEF DESCRIPTION OF THE DRAWINGS

The present invention will be understood and appreciated more fully from the following detailed description, taken in conjunction with the drawings, in which:

FIG. 7 is a schematic view of an embodiment of a planar optical correlator obtained by rotating one substrate through 180°, thereby doubling it back under the first one and optionally attaching them together, with the optical elements sandwiched in between.

DETAILED DESCRIPTION OF A PREFERRED EMBODIMENT

Figure 1:
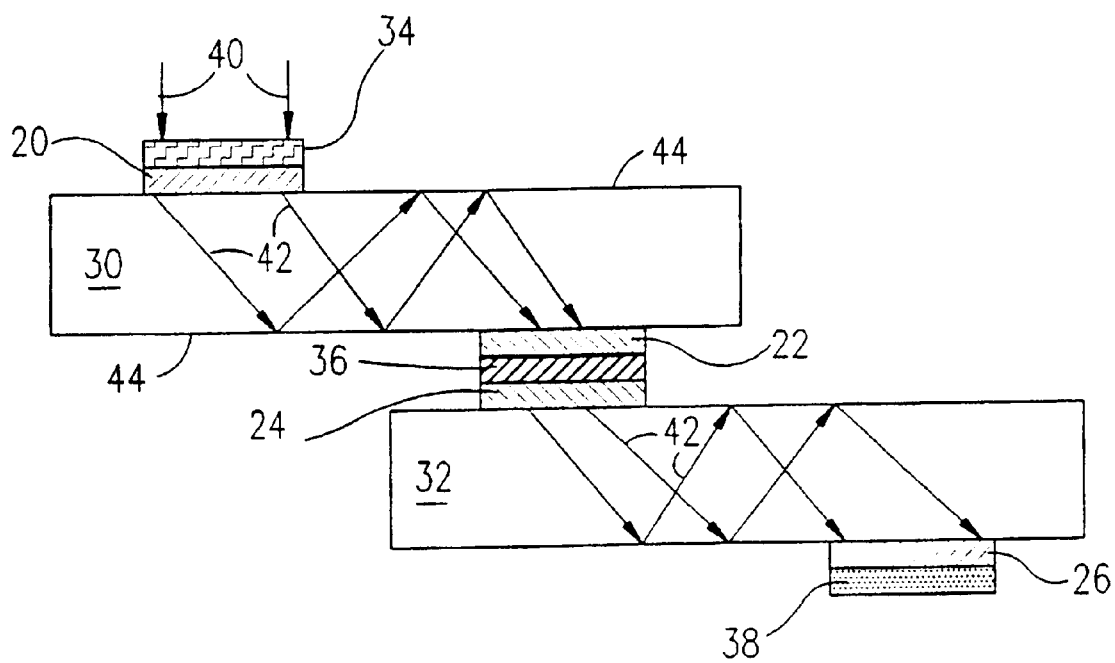
FIG. 1 is a schematic view of a correlator constructed according to a preferred implementation of this invention, showing both substrates, each with a pair of holographic lenses and a filter disposed between them, and the propagation of light within the substrates by total internal reflection, or by specular reflection.

Reference is now made to FIG. 1, which shows the construction and operation of a planar optical correlator according to a preferred embodiment of the present invention. The refractive lenses are off-axis holographic lenses, 20, 22, 24 and 26, which are designated the first, second, third and fourth lenses respectively. These lenses are disposed on thin planar substrates 30, 32, of a transparent optical material, such as glass. The input signal may be derived from a monochromatic two dimensional display device, or from a transparency 34 containing the input signal data, illuminated by an incident monochromatic beam 40. This incident monochromatic beam may be a coherent beam such as from a laser, or an incoherent plane wave from another source. This signal is inputted to the correlator through the first holographic lens 20, and propagates through the first substrate 30 by means of total internal reflection 42 off the top and bottom surfaces of the substrate. Alternatively, the surfaces of the substrate can be coated with a high reflectivity coating 44, either dielectric or metallic, and the light then propagates by specular reflection from the top and bottom surfaces of the substrate. The light is incident on the second holographic lens 22 of the first substrate, which is preferably disposed at the far end of the substrate, and exits the substrate therethrough.

On the second substrate 32 are disposed the third holographic lens 24, acting as its input lens, and the fourth holographic lens 26, acting as its output lens. This substrate is disposed relative to the first substrate 30 such that the light from the exit holographic lens 22 of the first substrate is coupled into the second substrate through its input holographic lens 24. A filter 36 containing the target signal is sandwiched between lenses 22 and 24. This filter may be a holographic filter, in which case, in order to ensure that the light emerging from the filter 36 impinges normally on the input lens 24 of the second pair, a linear grating needs to be placed after the filter. to deflect the light into the correct direction. The filter may also be constructed with a transmissive liquid crystal display (LCD) which functions as a dynamic spatial light modulator, capable of being controlled electronically at video rate. This embodiment is useful for situations where the target signal is a dynamically changing function, which is to be correlated with the input signal function in real time.

After traversing the second substrate 32 by means of reflection 42, the light is exited through the fourth holographic lens 26 preferably disposed at the far end of the substrate. The output signal is detected by means of a two dimensional detector 38 such as a CCD array, attached to lens 26. Since this array does not detect phase information, this lens can usually be replaced by a simple linear grating to couple the light out of the substrate and into the CCD array.

The above embodiment of the planar optical correlator has been described as the planar equivalent of the conventional bulk optical correlator consisting of two pairs of two lenses separated by free space, which in this invention is replaced by the optical medium of the substrates. It is appreciated that this invention can also be implemented by using more than two lenses for performing the Fourier transformation in each stage of the correlator, and the correlator can also be made multi-staged by adding substrates beyond the two described herein.

The pair of off-axis holographic lenses recorded on each substrate each performs a Fourier transformation. The required grating function $\phi_h$ of each holographic lens is given by:

$$\varphi_h = -\frac{2\pi}{\lambda}\left[\frac{x^2\cos^2\theta_0 + y^2}{2F} - x\sin\theta_0\right] \quad (1)$$

where $\lambda$ is the wavelength, F is the focal length, $\theta_0$ is the off-axis angle inside the substrate and (x,y) are the lateral coordinates at the plane of the holographic lens. Such off-axis lenses have different optical powers in the x- and y-directions, where the ratio between them is the factor $\cos^2\theta_0$.

When the input signal t(xhd i,$y_i$) adjacent to the first holographic lens 20 is illuminated with a plane wave, the field U($x_o$,$y_o$) behind the second holographic lens 22 is given by:

$$U(x_o, y_o) \alpha \int\int t(x_i, y_i)\exp\left(-i2\pi\left[\frac{x_i x_o \cos^2\theta_0}{\lambda F} + \frac{y_i y_o}{\lambda F}\right]\right)dx_i\, dy_i \quad (2)$$

where ($x_i$,$y_i$) are the coordinates at the input plane at the first holographic lens 20, and ($x_o$,$y_o$) are the coordinates at the output plane at the second holographic lens 22. This result, obtained by using the paraxial approximation with respect to the slanted optical axis, indicates that the field behind lens 22 is the Fourier transformation of the input signal t($x_i$,$y_i$). Because of the slanted optical axis, this Fourier transformation differs from the ordinary one in that it has a different scale in the x- and y- directions. Specifically, the spatial frequencies in this configuration are scaled in accordance to $$f_x = \frac{x_o \cos^2\theta_0}{\lambda F} \quad f_y = \frac{y_o}{\lambda F} \quad (3)$$

where the $\cos^2\theta_0$ term in $f_x$ results from the off-axis geometry. Such a scale change is deterministic and must be taken into account when incorporating the planar holographic lens pair into the correlator. Despite the different scaling factors in the x- and y-directions, all the properties of the ordinary Fourier transformation, including space invariance, are still valid.

This combination of two Fourier transformations with a filter between them performs optical correlation between the input signal and the filter function. The correlated output is sensed on the two dimensional detector 38, which is preferably a CCD array, or a monitor camera containing such a CCD array.

The necessary requirement of the planar holographic lenses are that they be constructed with the grating function of Equation (1). There are several methods by which such a holographic lens may be formed. A preferred method has been described by S. Reinhorn et al. in op. cit. and is performed by recording the interference pattern of an on-axis plane wave and an off-axis spherical wave. Such a recording yields the desired grating function when the f-number of the lenses are sufficiently large, i.e. greater than about 10. When recording the planar holographic lenses, it is necessary to ensure that the off-axis angle $\theta_0$ for the chief ray of the spherical beam inside the substrate is sufficiently large so that the entire spherical wave is trapped inside the substrate by total internal reflection, i.e. it is important that $\theta_0 > \sin^{-1}(1/n)$, where n is the refractive index of the substrate.

Figure 2:
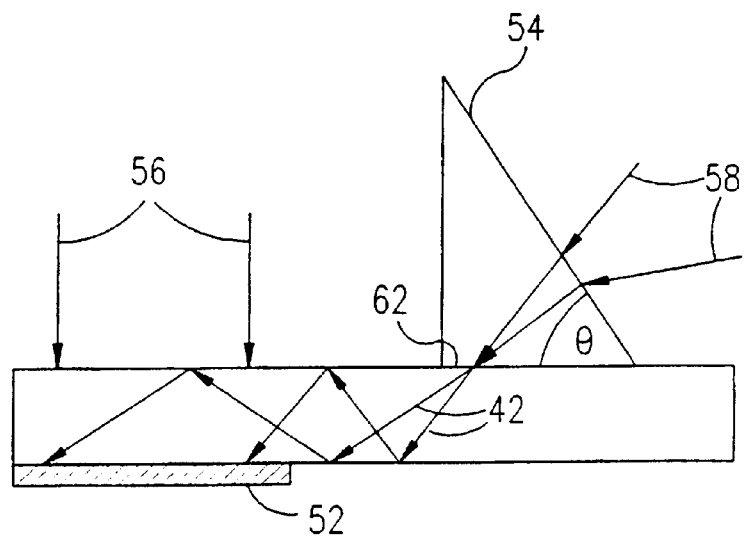
FIG. 2 is a schematic view of the apparatus required for performing a preferred method of recording the holographic lenses used on each substrate.

If the holographic lens recording procedure proposed by S. Reinhorn et al. in op. cit. is used, then a preferred method of performing this, using a prism with the same refractive index as the substrate, is illustrated in FIG.2. In order to minimise the aberrations that usually occur when a non-planar wavefront propagates between two media of different refractive indices, the spherical wavefront 58 is made to impinge normally on the front surface of the prism 54, so that it converges and focusses onto the prism surface that is attached with an index matching oil 62 to the planar substrate surface. The angle between these two prism surfaces should be exactly the off-axis angle, $\theta_0$. After penetrating the substrate surface, the spherical wave diverges from the entry surface and propagates by means of internal reflection 42 until it impinges on the holographic recording medium 52. There it interferes with an on-axis plane wave 56, incident on the substrate directly opposite the recording medium. In this way, it is assured that the Fourier plane of the planar holographic lens lies exactly on the substrate surface.

The recording is preferably made as a volume grating, and hence a thick phase material is used so that the Bragg relations for volume gratings are obeyed. The second planar holographic lens of the pair on each substrate is recorded in the same way after rotating the substrate by 180°.

Figure 3:
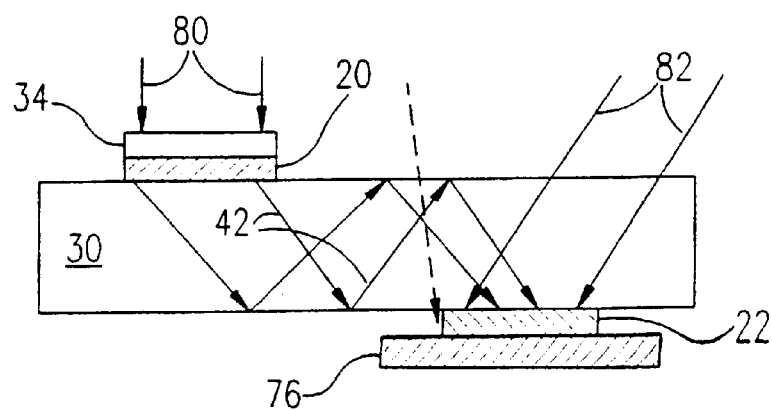
FIG. 3 is a schematic view of the apparatus required for performing a preferred method of recording a holographic matched filter for installation in the correlator.

If the filter used is a holographic filter, then FIG. 3 illustrates a preferred procedure for recording it. The target signal, typically in the form of a transparency 34, is disposed in close contact with the first holographic lens 20 on the planar substrate 30, and is illuminated with a plane monochromatic wave 80. The beam enters the substrate and propagates by internal reflection 42 along the substrate to the output lens 22 of the lens pair. The Fourier transform of the signal is obtained immediately behind lens 22, with the correct $\cos^2\theta_0$ scaling factor between the axes. A reference plane wave 82 is directed at the substrate so that it impinges thereon immediately opposite lens 22. It is directed at an angle of incidence that does not fulfil the Bragg condition for lens 22, and so is not affected by it. The resulting interference between the waves of the scaled Fourier transform of the target signal and the plane reference beam are recorded on a holographic plate 76 disposed in close contact with the second holographic lens 22, to produce the required holographic filter.

Figure 4:
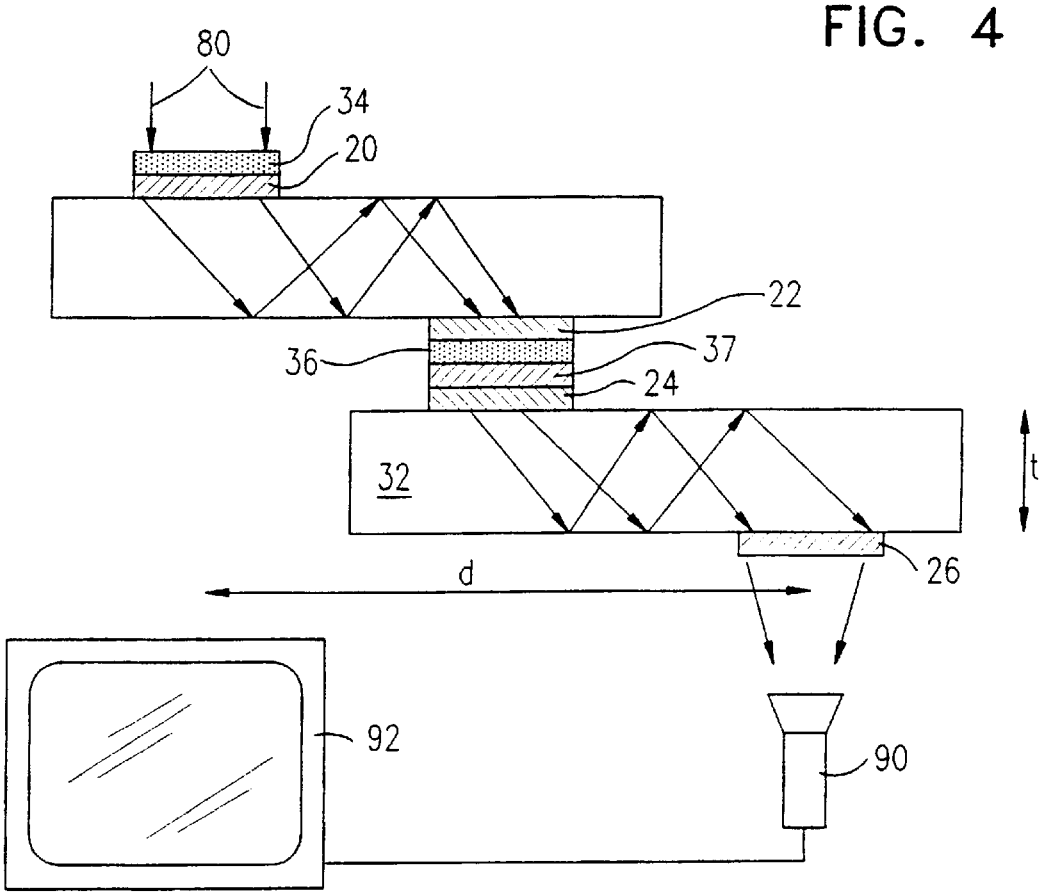
FIG. 4 is a schematic view of a system constructed to perform optical correlation using the planar optical correlator described in this invention.

FIG. 4 shows a preferable implementation of the present invention in a complete system for executing optical correlation. An input transparency 34 containing the signal data is attached to the first substrate 30 at the input holographic lens 20, and is illuminated with a monochromatic plane wave 80. The target filter 36 and, in the case when the target filter is a holographic filter, a linear grating 37, are sandwiched between the second 22 and third 24 holographic lenses. The output plane 26 is imaged by means of a CCD camera 90, and the resulting correlation output displayed on a monitor 92.

The substrates used in this system are of B270 glass with thickness t=10 mm, and the distance d between input and output beams is of the order of 100 mm. The off-axis angle inside the substrate is 55°, the focal length of each holographic lens is about 87 mm, and the effective aperture of each lens is 4 mm. The diffraction limited spot of such a lens is approximately 13 µm., so that the space-bandwidth product (SBP) is about $300^2$. It is therefore possible to achieve resolutions of 300×300 pixels both for the input illumination and for the kernel image, making the resolution performance of the planar optical correlator competitive with that of other correlation methods.

The overall volume of the correlator itself, without its associated input and output optical components, is only 10 cc.

Figure 5A:
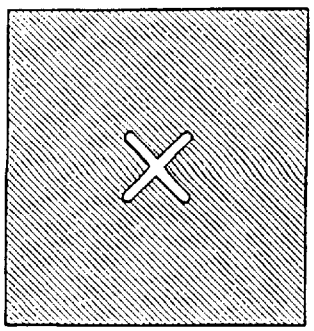
FIG. 5A shows a typical target signal recorded on the filter.
Figure 5B:
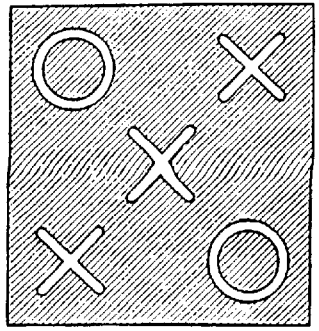
FIG. 5B a typical input signal used together with such a target signal, to illustrate the operation of the planar optical correlator system shown in FIG. 4.

FIG. 5A shows a typical target signal filter, which may be used to test the performance of the planar optical correlator, and FIG. 5B is a typical input signal for correlating with the target filter.

Figure 6:
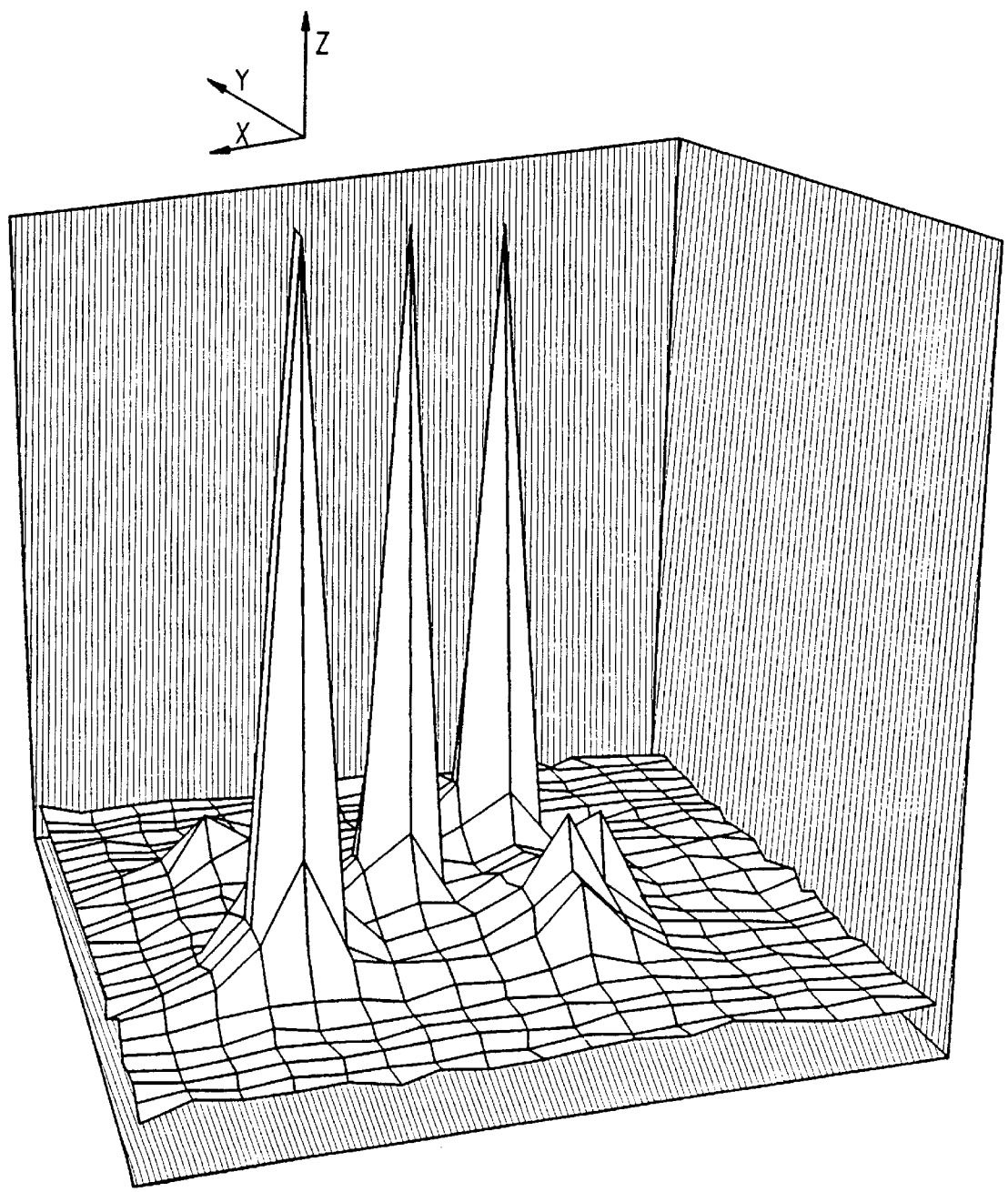
FIG. 6 illustrates the output signals obtained from the planar optical correlator system using the target filter and input signal of FIGS. 5A and 5B respectively.

FIG. 6 shows the measured output intensity distribution resulting from the test signals shown in FIG. 5A and 5B. There are three correlation peaks corresponding to the three target signals "X" of the input shown in FIG. 5B. The location of the peaks corresponds to the position of the X's in the input signal. As is seen from the sharpness and distinctness of the peaks, the planar correlator performs its function well.

The filter need not be confined to a holographic filter, whether a matched type or not, but can be implemented by any other method, so long as the scale difference in the Fourier plane is taken into account.

Figure 7:
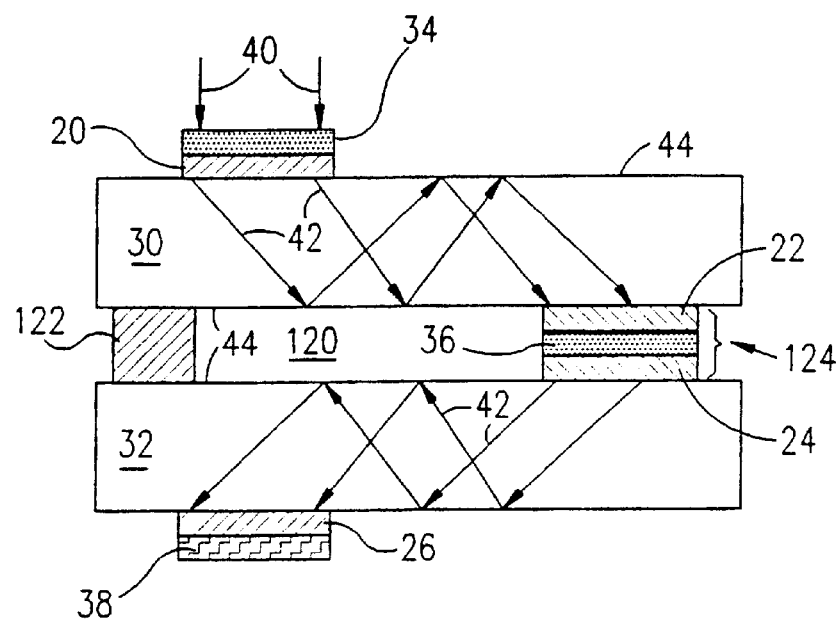

The above embodiment can be reduced in volume in a number of ways. The second substrate 32 can be rotated by 180° and doubled back under the first substrate 30, with the optical elements sandwiched in between, as illustrated in FIG.7. The other optical components are the same as those shown in the open configuration shown in FIG.1, and use the same labelling as in that figure. In this configuration, the length of the whole correlator is approximately halved, and the double substrate construction effectively replaced by a more robust construction effectively resembling a single substrate. The air gap 120 between the two substrates is needed to ensure that the light inside each substrate undergoes total internal reflection in propagating between the input and output holographic lenses of each substrate. In order to maintain this gap, and to provide mechanical stability to the structure, a spacer 122 is disposed at the end of the assembly distant from the the lens/filter/lens stack 124. In order to provide higher mechanical stability, the air gap can be replaced by a thin layer of an optical medium with lower refractive index than the substrate material. In this case, the value of $\theta_0$ is changed, and the optical design of the holographic lenses altered accordingly. As an alternative, the surfaces of the substrate can be coated with a high reflectivity layer 44 to provide specular internal reflection 42, and the two substrates bonded together to provide robustness.

Figure 8:
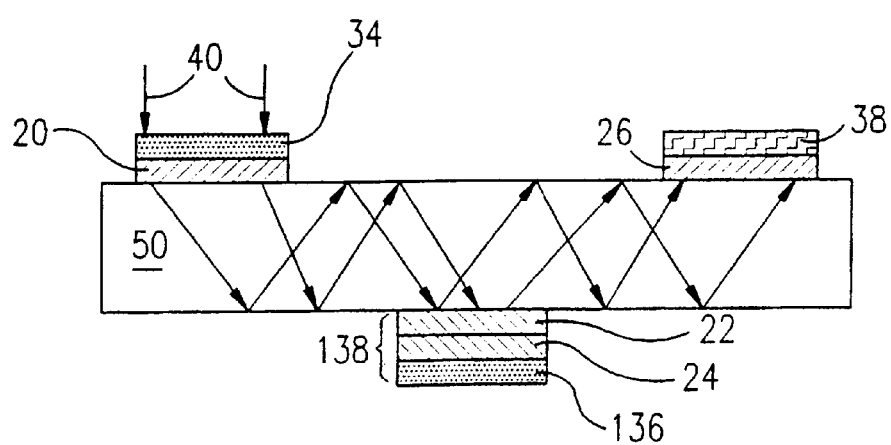
FIG. 8 is a schematic view of an embodiment of a planar optical correlator constructed on one substrate, and wherein the filter containing the target signal information is reflective, and the output holgraphic lens of the first pair, the input holgraphic lens of the second pair, and the said reflective filter are all stacked one on top of the other, on the bottom of the substrate at its center.

A further embodiment, illustrated in FIG.8, enables the complete planar optical correlator to be constructed on a single substrate. In this configuration, the output holographic lens 22 of the first lens pair, the input holographic lens 24 of the second lens pair, and the filter 136 are all disposed, in that order, in a stack at or near the center of the substrate 50. The lenses may be separately recorded and mounted together, or may be combined and recorded together as a single element 138. The filter must be a reflective off-axis type. It can be implemented by means of an LCD with its reflective layer constructed to operate at the required off-axis angle. The other optical components are the same as those shown in the open configuration of FIG. 1, and use the same labelling as in that figure.

Since the light passes through each holographic lens twice, the lenses must be specially constructed so that they refract the light to ensure correct operation of the correlator. Thus, the second holographic lens 22 is constructed such that for the incident light passing through it, the regular Bragg conditions of refraction are obeyed, whilst for the reflected light passing back up through it after traversing the filter 136, it is inoperative, and the light passes through undeviated. Likewise, the third holographic lens 24 is inoperative on the incident light, and only acts as a lens on the reflected light after traversing the filter.

The substrates in any of the above embodiments can be made considerably thinner than the 10 mm used in the embodiment shown in FIG. 4. The above configurations and methods make it possible to reduce the volume of the correlator to less than 1 cc., which is compatible with the volume of other microelectronic and planar optoelectronic components.

It will be appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A planar optical correlator comprising:
    at least first and second optical substrates, through which light propagates by means of internal reflection;
    at least first and second holographic lenses disposed on the first optical substrate, and at least third and fourth holographic lenses disposed on the second substrate, each of the at least first and second and at least third and fourth holographic lenses being operative for performing a Fourier transformation of light inputted to its respective substrate, said at least first and second substrates being disposed such that the second holographic lens at least partially faces the third holographic lens; and
    a filter containing target signal information disposed between the second and third holographic lenses.

2. A planar optical correlator according to claim 1 and wherein said filter is a holographic filter.

3. A planar optical correlator according to claim 1 and wherein said filter comprises a dynamic spatial light modulator.

4. A planar optical correlator according to claim 1 and wherein a linear grating is disposed following the filter to ensure normal incidence of the light into the second substrate.

5. A planar optical correlator according to claim 1 and wherein the optical substrate is made of glass.

6. A planar optical correlator according to claim 1, and wherein the holographic lenses have different optical powers in the two orthogonal lateral directions to compensate for the off-axis orientation of the propagation.

7. A planar optical correlator according to claim 1, and wherein the holographic lenses are recorded by means of two waves that interfere to generate the grating function $$\varphi_h = -\frac{2\pi}{\lambda}\left[\frac{x^2\cos^2\theta_0 + y^2}{2F} - x\sin\theta_0\right]$$

where $\lambda$ is the wavelength, F is the focal length of the lens, $\theta_0$ is the off-axis angle inside the substrate and (x,y) are the lateral coordinates at the plane of the holographic lens.

8. A planar optical correlator according to claim 1 and wherein the filter has different characteristics in the two orthogonal lateral directions to compensate for the off-axis orientation of the propagation.

9. A planar optical correlator according to claim 1 and wherein the optical input to the first holographic lens is provided by means of a two dimensional display.

10. A planar optical correlator according to claim 1 and wherein the optical input to the first holographic lens is provided by means of an illuminated transparent medium containing the input signal.

11. A planar optical correlator according to claim 1 and wherein the optically correlated output signal at the fourth holographic lens is detected by means of a two dimensional detector.

12. A planar optical correlator according to claim 1 and wherein the two dimensional detector is a CCD array.

13. A planar optical correlator according to claim 1 and wherein the fourth holographic lens is replaced with a linear grating for outputting the light to the detector array.

14. A planar optical correlator according to claim 1 and wherein first and second substrates are aligned contiguously, one after the other.

15. A planar optical correlator according to claim 1, and wherein first and second substrates are aligned overlapping, one on top of the other, to effectively comprise one continuous substrate.

16. A planar optical correlator according to claim 1, constructed on one substrate, and wherein the filter containing the target signal information is reflective, and the second holographic lens, the third holographic lens and the reflective filter are all disposed one on top of the other.

17. A planar optical correlator according to claim 16, and wherein the second holographic lens and the third holographic lens are combined into one element.

* * * * *